(12) United States Patent
Ottesen et al.

(10) Patent No.: US 6,571,310 B1
(45) Date of Patent: May 27, 2003

(54) METHOD AND APPARATUS FOR MANAGING A HETEROGENEOUS DATA STORAGE SYSTEM

(75) Inventors: Hal Hjallmar Ottesen, Rochester, MN (US); Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,821

(22) Filed: Apr. 20, 2000

(51) Int. Cl.[7] .............................................. G06F 12/00
(52) U.S. Cl. .............................. 711/5; 711/170; 711/4; 710/63; 360/48
(58) Field of Search ........................ 711/170–171, 172, 711/173, 112, 4, 5; 710/11, 16, 63; 360/48, 264.4; 709/104

(56) References Cited

U.S. PATENT DOCUMENTS

| | | | | |
|---|---|---|---|---|
| 4,642,803 A | * | 2/1987 | Drexler .................... | 250/208.5 |
| 5,018,060 A | * | 5/1991 | Gelb et al. .................. | 707/205 |
| 5,327,156 A | * | 7/1994 | Masukane et al. .......... | 345/547 |
| 5,467,558 A | * | 11/1995 | Kober et al. .................. | 49/209 |
| 5,594,924 A | | 1/1997 | Ottesen et al. | |
| 5,630,104 A | | 5/1997 | Ottesen et al. | |
| 5,732,215 A | | 3/1998 | Boutaghou et al. | |
| 5,761,007 A | * | 6/1998 | Price et al. .............. | 360/264.4 |
| 5,960,169 A | | 9/1999 | Styczinski | |
| 5,974,085 A | * | 10/1999 | Smith .......................... | 375/219 |
| 6,075,665 A | * | 6/2000 | Chainer et al. ................ | 360/48 |
| 6,118,738 A | * | 9/2000 | Uehara ..................... | 369/30.35 |
| 6,128,717 A | * | 10/2000 | Harrison et al. ............... | 710/11 |

* cited by examiner

*Primary Examiner*—B. James Peikari
(74) *Attorney, Agent, or Firm*—Roy W. Truelson

(57) ABSTRACT

A set of data storage devices are used to store heterogeneous data, i.e., to store some alphanumeric data, and some multimedia data. The internal operating parameters of the storage devices are monitored, and data is selectively stored by matching the type of data to the internal operating parameters of the storage devices. Preferably, the set of data storage devices is a RAID system containing multiple rotating magnetic disk drive storage devices. The system monitors the operating temperature, the soft error rate, the head flyheight, and the actuator performance of the drives in the system. A fuzzy logic classification system is used to generate a set of fuzzy classification scores evaluating each drive as most appropriate to one of three types of data: alphanumeric, graphics/sound, or video. A drive is selected for storing a type of data according to the fuzzy classification scores. Optionally, a separate set of fuzzy classification scores is generated for each disk surface, and each disk surface may independently be allocated to data of different types. In the preferred embodiment, a disk drive has on-board soft error recovery procedures for recovering data following a soft error, and the capability to selectively disable or limit this feature. If a disk drive is selected for storage of multimedia data, the soft error recovery is disabled, and soft errors are simply transmitted to the host system as data. If each disk surface may be independently allocated to data of different types, soft error recovery may be independently disabled for each disk surface.

23 Claims, 10 Drawing Sheets

METHOD AND APPARATUS FOR MANAGING A HETEROGENEOUS DATA STORAGE SYSTEM

FIELD OF THE INVENTION

The present invention relates to digital data storage devices, and in particular, to the management of digital data on multiple data storage devices.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modem computer systems require large capacity mass data storage devices. While various data storage technologies are available, the rotating magnetic rigid disk drive has become by far the most ubiquitous. A disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed from proper drive operation. Furthermore, although each drive communicates with a host computer system or other external entity over a pre-defined, fixed interface, there may be significant differences among the internal operating parameters of multiple disk drives, even though the drives are of the same model from the same manufacturer. These differences typically become greater as the drives age. The situation may be likened to that of an automobile. Every automobile must meet certain common requirements in terms of overall dimensions, weight, operating speed, existence of safety features, etc. But internally, there may be vast differences. Furthermore, even among automobiles of the same manufacturer, year, and model, there can be differences in performance, gas mileage, rate of repair, and many other factors. These differences among individual automobiles tend to become greater as the automobiles become older.

Although there have been enormous increases in the data storage capacity of disk drives in recent years, drive designers are still pressed to keep up with the voracious demands of computer users for data storage. The popularity of the World Wide Web (often known simply as the "Web") has opened a new field of storage demand that was nonexistent only a few years ago. Web server computer systems provide text, graphics, sound and video on demand. Providing text alone for many of the applications on the Web would require massive amounts of data, but this can be dwarfed by the amount of multimedia data needed, such as graphics, sound and video. Such server systems typically require access to very large databases for servicing requests from web users, databases which are often stored on rotating magnetic disk drives.

The sheer volume of data required for supporting a web server may require a considerable number of disk drive storage devices. Given the complexity of these devices, and the fact that the demands of the marketplace require designers to push storage capacity and performance to their limits, it is not surprising they can and do sometimes fail. The use of a large number of data storage devices in a server increases the probability that any single device will fail.

For a commercial enterprise doing business on the Web, its web server is its lifeline. If, for any reason, the web server fails to operate, the business effectively shuts down. Therefore, the reliability of the data storage devices, and the continuous availability of the data on demand, is of critical importance to the business.

Various things may be done and devices employed in order to reduce the risk or effect of data loss and/or data unavailability in a web server or similar large database system. One approach which has gained increased acceptance in recent years is to maintain data on multiple disk drives in a redundant form, using any of several types of disk drive collections commonly referred to as "RAID" (Redundant Arrays of Independent Disks). RAIDs have many varying features and characteristics, but in general, a RAID has the capability to reconstruct data stored on any single disk drive in the event of a failure of that disk drive from the data stored on other disk drives in the RAID. Various types of RAIDs providing different forms of redundancy are described in a paper entitled "A Case for Redundant Arrays of Inexpensive Disks (RAID), by Patterson, Gibson an Katz, presented at the ACM SIGMOD Conference, June 1998. In addition, many modern RAIDS have the capability to dynamically reconstruct lost data from a defective disk drive while operating, using hot spare drives, large caches, and other features to assure continuous data availability.

While conventional RAID systems provide improved data reliability and availability when compared to non-redundant collections of disk drives, such systems are expensive to build and to operate. One reason for the high expense of conventional RAID systems is that such systems, as well as the disk drives themselves, are designed to meet standards of data reliability and data access appropriate to alphanumeric data. When dealing with the storage and retrieval of alphanumeric data, every bit is potentially of critical importance. For example, the corruption of a single bit in a compiled computer program could cause the program to perform the wrong operation, branch to the wrong location, store data in the wrong location, obtain data from the wrong source, etc. The results would be unpredictable, and potentially disastrous. The corruption of a single bit in accounting data could amount to an error of millions of dollars. Additionally, alphanumeric data is often stored in databases comprising a large number of relatively small individual records. These records are often accessed in a somewhat random pattern, requiring considerable actuator movement to locate the proper track on which the data is stored, and actuator performance is therefore a significant operating characteristic.

The above observations are not generally true of multimedia data. The corruption of a single bit, or even several bits, in a digital photograph, sound recording, or video clip, is likely to go unnoticed, and even if noticed, will not have the potentially severe consequences of the corruption of an alphanumeric bit. Furthermore, multimedia data is typically stored in large files which are read as a whole. In accessing multimedia data, a disk drive will tend to spend less time in seek operations, and more time simply reading the data. Thus, actuator performance is a less significant characteristic when accessing multimedia data than it is in the case of alphanumeric data.

Conventional RAID systems and other storage technology fail to adequately exploit the differences mentioned above. Increased demand for data storage in web servers and similar environments requires further refinements in the art.

SUMMARY OF THE INVENTION

In accordance with the present invention, a set of digital data storage devices such as a rotating magnetic disk drives are used to store heterogeneous data, i.e., to store some alphanumeric data, and some multimedia data. The internal operating parameters of the data storage devices are monitored, and data is selectively stored by matching the type of data to the internal operating parameters of the storage devices.

In the preferred embodiment, the set of data storage devices is a RAID system containing multiple rotating magnetic disk drive storage devices. The system monitors the operating temperature, the soft error rate, the head flyheight, and the actuator performance of the drives in the system. Data is generally classified as belonging to one of three types: alphanumeric data, graphics/sound data, and video data. A fuzzy logic function is used to generate a set of fuzzy classification scores evaluating each drive as most appropriate to one type of data or another. A drive is selected for storing a type of data according to the fuzzy classification scores.

In one variation of the preferred embodiment, a separate set of fuzzy classification scores is generated for each disk surface, and each disk surface may independently be allocated to data of different types.

In the preferred embodiment, a disk drive has on-board soft error recovery procedures for recovering data following a soft error, and the capability to selectively disable or limit this feature. If a disk drive is selected for storage of multimedia data, the soft error recovery is disabled, and soft errors are simply transmitted to the host system as data. If each disk surface may be independently allocated to data of different types, soft error recovery may be independently disabled or limited for each disk surface.

In the preferred embodiment, different forms of data redundancy may be selected for different groups of disk drives storage devices depending on the type of data stored thereon. For example, alphanumeric data may be mirrored to improve write performance, while multimedia data is parity protected to conserve resources.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview

Figure 1:
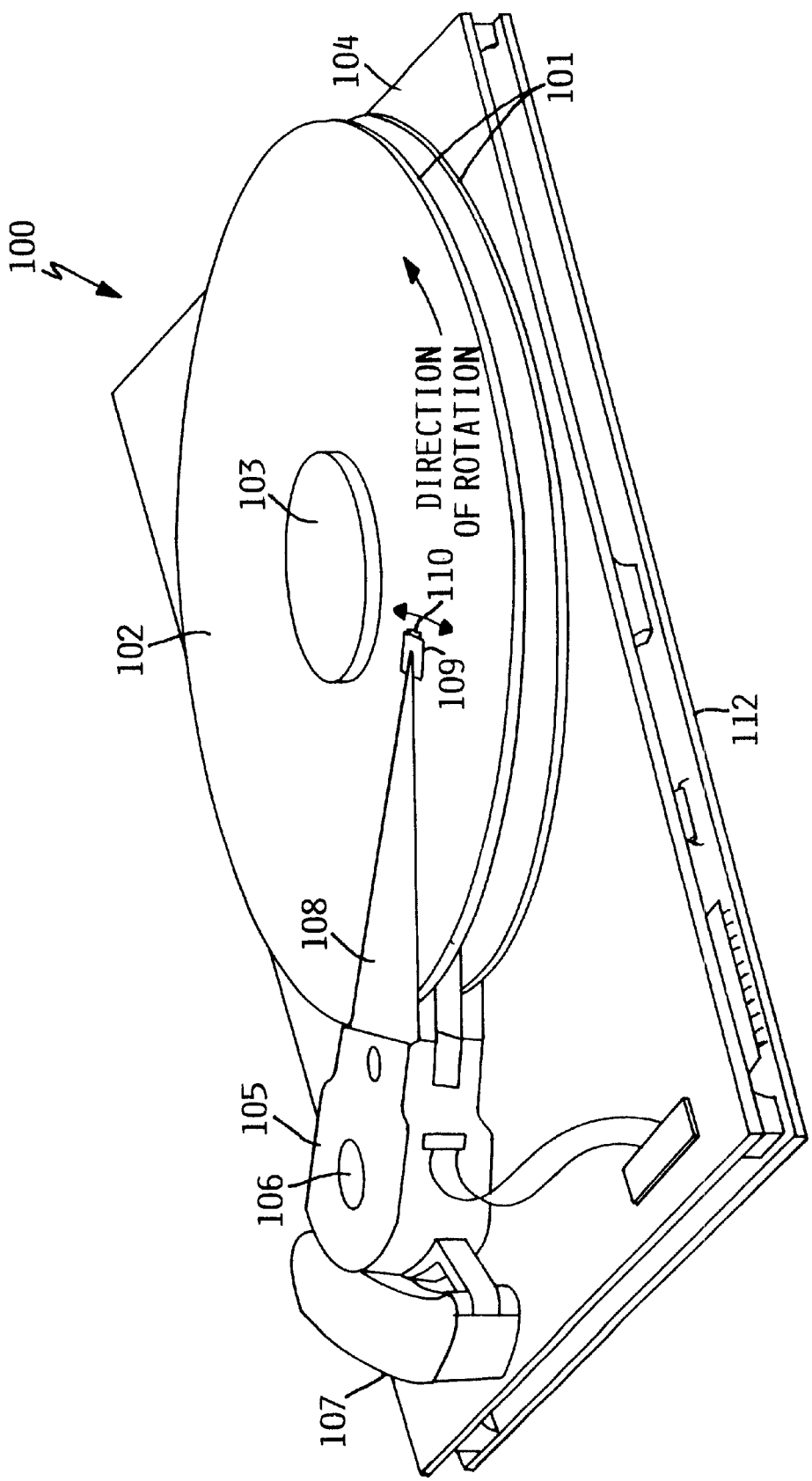
FIG. 1 is a simplified representation of a rotating magnetic disk drive storage device, for use in accordance with the preferred embodiment of the present invention.

A disk drive typically contains one or more smooth, flat disks which are rigidly attached to a common spindle or hub. Where more than one disk is used, the disks are stacked on the spindle parallel to each other and spaced apart so that they do not touch. The disks and spindle are rotated in unison at a constant speed by a spindle motor.

Each disk is formed of a solid disk-shaped base or substrate, having a hole in the center for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electro-magnetic motor on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electromagnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo patterns identifying the data tracks are written on at least one disk surface. The transducer periodically reads the servo patterns to determine its current deviation from the desired radial position, and the feedback system adjusts the position of the actuator to minimize the deviation. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element.

Because it is common to push the limits of many of the components in disk drive design, it is expected that a disk drive will experience some "soft errors". A soft error is an intermittent or non-repeatable error observed during data access, from which it is still possible to recover the data (as opposed to a "hard error", which implies that data written at a particular location can not be recovered). Soft errors may be caused by many factors, alone or in combination, e.g., external vibration which causes the head to be mispositioned, insufficient settling following an actuator seek operation, internal vibration in spindle motor bearings or other components, electrical noise, etc. When a disk drive encounters a soft error, it initiates a soft error recovery procedure to attempt to recover the data. Typically, a soft error recovery procedure is a defined sequence of steps, proceeding from the simpler to the more complex and time consuming. The simplest step may be to merely re-read the data. If this does not work, the drive may attempt other forms of soft error recovery, e.g., changing the actuator position while re-reading the data, and proceeding to more complicated forms of recovery. If nothing works, the error is classified as a "hard error", which may cause actual data loss to the user.

Detailed Description

Referring to the Drawing, wherein like numbers denote like parts throughout the several views, FIG. 1 is a simplified drawing of a rotating magnetic disk drive storage device 100, for use in accordance with the preferred embodiment. Disk drive 100 comprises rotatable disks 101, which are rigidly attached to hub assembly or spindle 103, which is mounted on disk drive base or housing 104. Spindle 103 and disks 101 are driven by a drive motor at a constant rotational velocity. The drive motor (not visible) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electromagnetic motor 107, to position the transducer heads. A cover (not shown) mates with base 104 to enclose and protect the disk and actuator assemblies. Electronic modules for controlling the operation of the drive and communicating with another device, such as a host computer, are mounted on circuit card 112. In this embodiment, circuit card 112 is shown mounted outside the enclosure formed by base 104 and the cover. However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic slider 109 with a read/write transducer 110 is located at the end of each head/suspension assembly 108 adjacent disk surface 102.

While disk drive 100 is shown with two disks having multiple disk surfaces for recording, it should be understood that the present invention could utilize a drive having a single disk, or having a larger number of disks, and that it would be possible to employ only a single disk surface of a disk for recording data.

Figure 2:
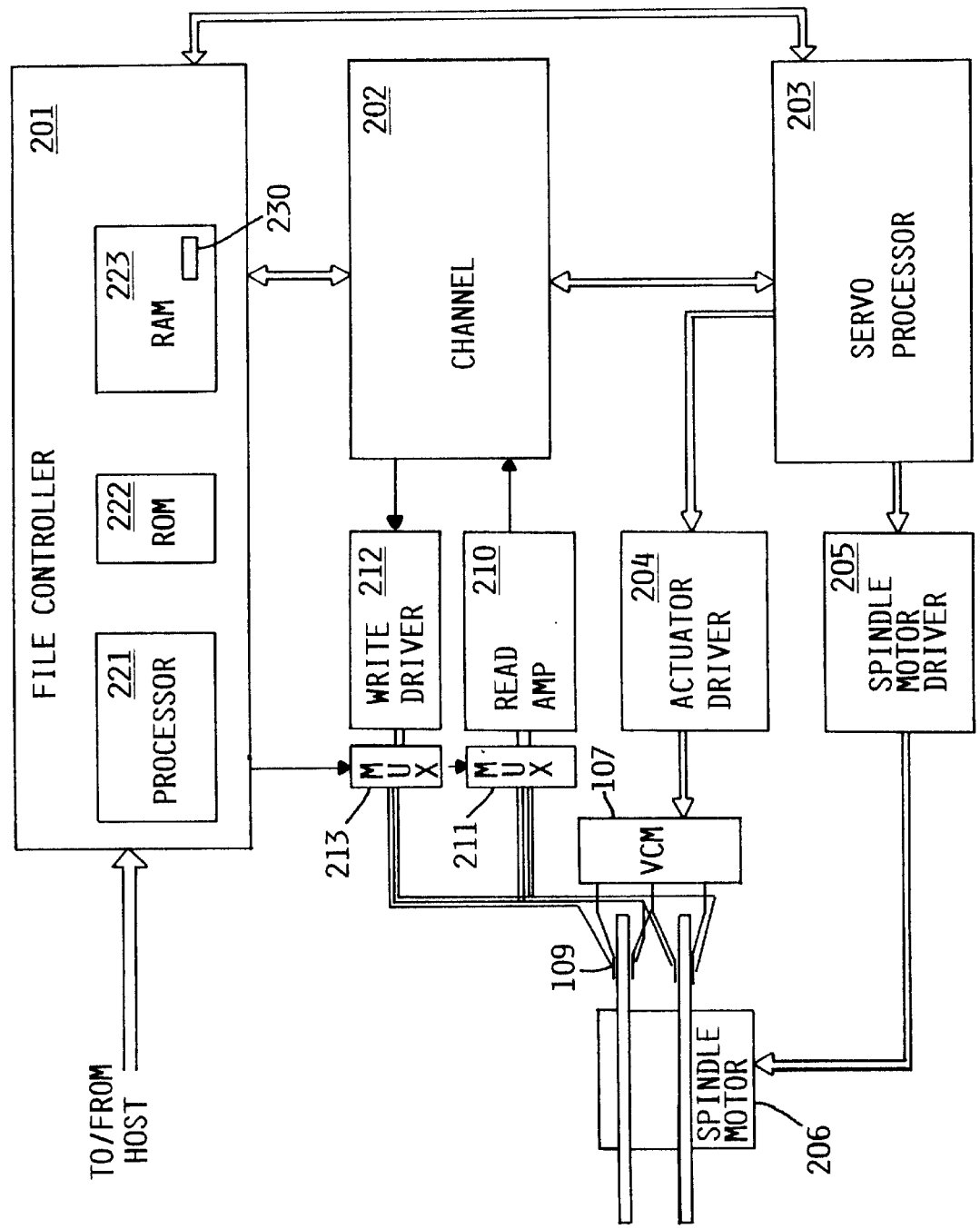
FIG. 2 is a high level diagram of the major electronic elements of a disk drive storage device, according to the preferred embodiment.

FIG. 2 is a high-level diagram of the major electronic elements of disk drive 100, showing how these are connected to one another and to the transducer heads, actuator motor and spindle motor, according to the preferred embodiment. File controller 201 provides a data interface to a host, such as a server system. Controller 201 also provides general control of the operation of disk drive 100, including such functions as command interpretation, sector mapping, power-up routines, diagnostics, etc. File controller 201 also provides a soft error recovery routine for recovering from soft errors. Channel electronics 202 provides modulation and demodulation function for data being written to and read from the disk surface. Servo processor 203 interprets servo signals obtained from reading servo patterns on the disk to control the actuator and spindle motors; it also responds to seek signals from file controller 201. Servo processor 203 determines the necessary parameters for actuator motor and spindle motor, and provides these as inputs to actuator motor drive circuitry 204 and spindle motor drive circuitry 205. Actuator motor drive circuitry 204 in turn provides drive current to actuator voice coil motor (VCM) 107, positioning actuator 105 to a desired location. Spindle motor drive circuitry 205 provides drive current to spindle motor 206, driving the motor at a desired rotational velocity.

Transducers 110 are attached via lead wires to write multiplexer 213 and to read multiplexer 211, which are in turn coupled to write driver 212 and read amplifier 210, respectively. Read amp 210 provides input to channel electronics 202. Channel electronics provides input to write drive 212. Multiplexers 211 and 213 select one of the heads for writing or reading, responsive to control signal 214 from file controller 201. Magnetic patterns representing data or servo signals are sensed by magneto-resistive read elements in transducers 110, amplified by read amp 210, and provided to channel electronics 202. Channel electronics preferably includes a partial-response maximum likelihood (PRML) filter for decoding data signals into coherent data fro use by a host system. When writing data, channel electronics 202 encodes data according to a pre-determined encoding format, and provides this data to write driver 212, which in turn drives current through an inductive write element to cause the data to be written on the disk surface.

Positioning of transducers 110 is achieved by a servo feedback loop system comprising transducers 110, read amp 210, channel electronics 202, servo processor 203, actuator driver 204, and actuator motor 107. Transducers 110 read servo patterns recorded at periodic intervals on disk surfaces 101; these are amplified by read amp 210; the servo patterns are converted to position information by channel electronics 202; position information is interpreted by servo processor 203 to determine an amount of drive current which must be supplied to actuator motor 107; and actuator driver 204 then generates the required drive current in response to a control signal from servo processor 203. Servo processor 203 uses the same information to interpret angular position and provide appropriate control signals to spindle motor driver 205.

File controller 201 preferably includes programmable processor 221 which executes a control program resident in read-only memory (ROM) 222. ROM 202 is a non-volatile semiconductor random access memory, the contents of which are not lost when disk drive 100 is powered down. File controller also includes volatile read/write memory (RAM) 223. RAM 223 is used as a temporary cache for data being read from and written to one or more of the disk surfaces. RAM 223 is also used for storing internal state variables necessary for drive operation.

File controller 201 also provides a soft error recovery routine for recovering from soft errors. Any of various techniques as are known in the art may be used, and combinations of techniques may be used whereby the file controller attempts a first technique, and if the first technique fails to recover the data, attempts a second technique either alone or in combination with the first technique. In the preferred embodiment, RAM 223 includes a state variable 230 indicating whether soft error recovery steps are enabled. State variable 230 may be a single 1-bit flag which enables or disables soft error recovery for the drive 100 as a whole, or may be an array of flags, one flag corresponding to each disk surface or to a portion of a disk surface, enabling or disabling soft error recovery for the respective disk surface or portion thereof, or may be a more complex structure such as an integer or array of integers, which indicate the limit of steps of soft error recovery that should be taken with respect to the disk drive as a whole, a disk surface of the drive, or a portion of a disk surface. Preferably, state variable 230 is stored in a dedicated location on a disk surface and is loaded into RAM 223 upon power-up of drive 100. State variable 230 could alternatively be stored in a register, a special cache, or some other form of memory. State variable 230 may be altered upon receipt of a special command from the host system. The purpose of selectively enabling and disabling soft error recovery is explained further herein.

Although certain disk drive features are shown and described above, in particular separate magneto-resistive read and inductive write transducers elements, it should be understood that these are by way of describing the preferred embodiment only, and it would be possible to practice the present invention using different transducer elements or other alternative disk drive design features.

Figure 3:
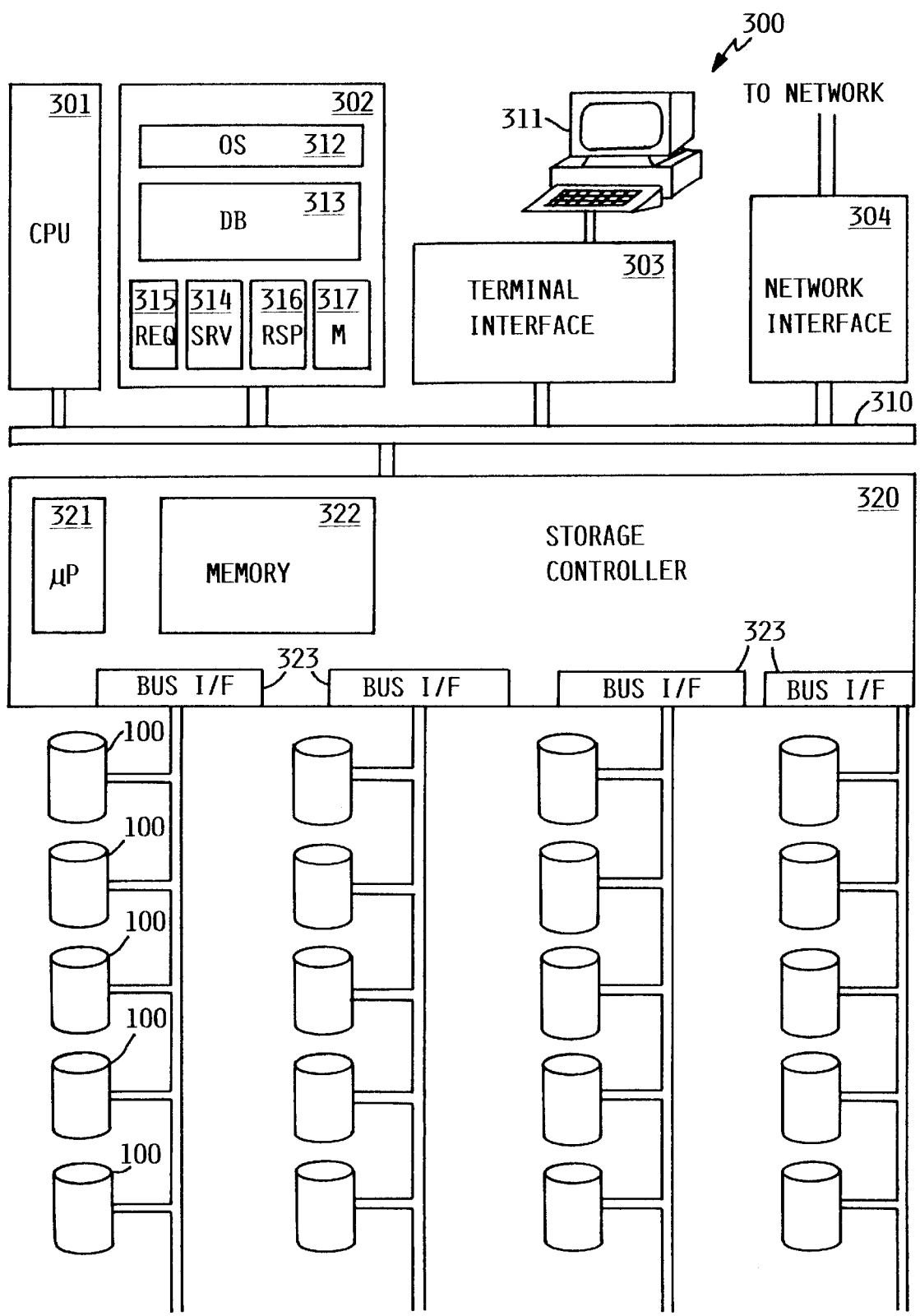
FIG. 3 shows a high-level block diagram of a server computer system acting as a central repository of heterogenous data, according to the preferred embodiment.

FIG. 3 shows a high-level block diagram of a server computer system 300 acting as central repository of heterogenous data, consistent with the preferred embodiment. Server computer system 300 comprises central processing unit (CPU) 301, main memory 302, terminal interface 303, and network interface 304. The various devices communicate with each other via internal communications bus 310. CPU 301 is a general-purpose programmable processor, executing instructions stored in memory 302; while a single CPU is shown in FIG. 3, it should be understood that a system having multiple CPUs could be used. Memory 302 is a random-access semiconductor memory for storing data and programs; memory is shown conceptually as a single monolithic entity, it being understood that memory is often arranged in a hierarchy of caches and other memory devices. Terminal interface 303 provides a connection for transmission of data to and from one or more terminals 311 (one being shown in FIG. 3). This may be implemented in a variety of ways. Many large server computer systems (mainframes) support the direct attachment of multiple terminals through terminal interface I/O processors, usually on one or more electronic circuit cards. Alternatively, interface 303 may provide a connection to a local area network. Various other alternatives are possible. External network interface 304 provides a physical connection for transmission of data to and from an external network, which is preferably the Internet, and could use any of various available technologies. Communications bus 310 supports transfer of data, commands and other information between different devices; while shown in simplified form as a single bus, it is typically structured as multiple buses, and may be arranged in a hierarchical form. The server computer system shown in FIG. 3 is intended to be a simplified exemplary representation, it being understood that many variations in system configuration are possible in addition to those specifically mentioned here. While system 300 could conceivably be a personal computer system, a server is more typically supported on a larger computer system such as an IBM Enterprise System, an IBM AS/400 system, or an IBM RS/6000 system.

Server system 300 is capable of storing a large amount of heterogenous data in multiple disk drive storage devices 100. Storage controller 320 provides an interface to the disk drive devices, and manages the storage of data on various devices. In particular, controller 320 assigns different types of data to different storage devices, as described more fully herein. Controller 320 additionally performs any required data redundancy functions, such as computing and updating parity. In order to support its function, controller 320 preferably comprises programmable processor 321, on-board memory 322, and storage bus interfaces 323 for handling communications with disk drive storage devices 100 over storage buses. Memory 322 contains a control program for execution on processor 321, to control the functions of storage controller 320. Memory 322 may also be used for storing state information, for caching data, or for other purposes. While memory 322 is shown as a single monolithic entity, controller 320 may in fact have multiple memories and caches assigned to different uses. For example the control program may be stored in a memory separate from that used for caching data, and the control program's memory may be read-only (ROM), while the memory for caching data is necessarily read/write. Additionally, some portions of the memory may be non-volatile to avoid losing state information or other key data.

It should be understood that disk drives, storage buses, and the configuration of such devices relative to storage controller 320, are represented in FIG. 3 as an exemplary embodiment. Many variations in number and configuration of devices are possible. For example, disk drives may be attached to redundant buses, bus interfaces, storage controllers, and other elements, so that no failure of any single component will cause data to be inaccessible. As another example, it would be possible for a collection of disk drives to be shared by multiple host computer systems, as described in U.S. Pat. No. 6,009,466 to Axberg et al., herein incorporated by reference.

In the exemplary embodiment shown and described herein, server 300 is used to operate a web site on the World Wide Web. For example, server 300 might operate an on-line retailer. In this case, server 300 will provide graphical images and textual descriptions of items available for sale, and interactively solicit information from clients such as items and quantity to order, shipping information, credit card information, etc. Depending on the types of items for sale, the web site might also provide audio or video demonstrations of the products. However, it should be understood that a storage system storing heterogeneous data in accordance with the present invention could be used for applications other than web servers.

The major software components of server system 300 are shown conceptually within memory 302. Operating system 312 provides various low-level software functions, such as device interfaces, management of memory pages, management of multiple tasks, etc. as is well-known in the art. Web database 313 contains data needed to build web pages or otherwise respond to client requests. Web server application 314 provides data to clients in response to requests received over the Internet. Such data may include textual data, graphics and/or video and sound. Request queue 315 temporarily stores requests from clients for data, such as a web page. Response queue 316 temporarily stores responses for transmission to requesting clients. Maintenance application 317 provides the persons responsible for maintaining the web site with the capability to alter the content of database 313.

While the software components of FIG. 3 are shown conceptually as residing in memory, it will be understood that in general the memory of a computer system will be too small to hold all programs and data simultaneously, and that information, especially information in database 313, is typically stored in data storage devices 100, and that the information is paged into memory by operating system 312 as required.

Server computer 300 and its components are shown and described in FIG. 3 as a more or less single, self-contained computer system. It is possible to implement a server in such a manner. It is alternatively possible to use multiple computer systems, particularly multiple systems which share a single large database stored on multiple storage devices 100, each computer having a specialized task. For example, one or more computer systems could be dedicated to database maintenance, while one or more other computer systems are dedicated to servicing requests for information. References herein to a "server" should be understood to include either a single computer or a collection of computer systems accessing a common data storage.

Figure 4:
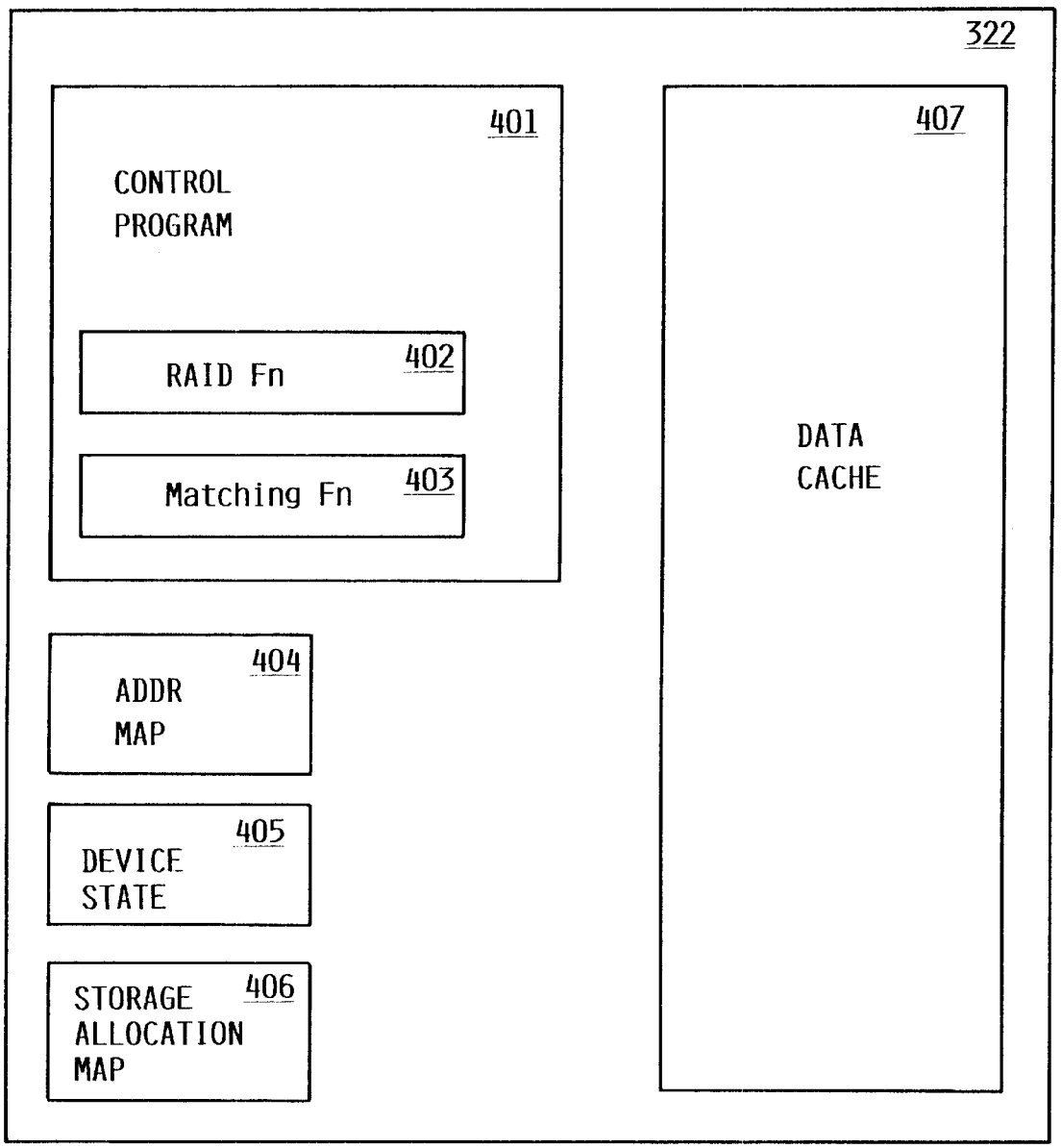
FIG. 4 is a conceptual representation of the entities stored within the memory of a storage controller, according to the preferred embodiment.

Storage controller 320 manages the collection of disk drive storage devices 100. FIG. 4 is a conceptual representation of memory 322 within storage controller 320. Memory 322 contains control program 401 which executes on processor 321 to control the operation of storage controller 320. Control program 401 may contain numerous storage controller functions as are known in the art, such as host interface functions, bus interface functions, cache management functions, diagnostic functions, etc.; these are not shown or described in detail herein. Control program 401 preferably also contains RAID functions 402 and data type matching function 403. Memory 322 further contains address map 404, device state table 405, and storage allocation map 406, which are used to selectively store data in a storage device appropriate to the type of data being stored, as further described herein. Memory 322 also contains data cache 407 for temporary storage of data being read from or written to storage devices 100. Data cache 407 may further be used for temporary storage of parity or other error correction data. It should be understood that FIG. 4 is a simplified conceptual representation, and that memory 322 may further contain additional data structures which are not shown.

RAID functions 402 maintain data redundancy for at least some of the data stored in disk drives 100 in accordance with any of various RAID algorithms, as are known in the art. RAID functions 402 further preferably provide the capability to reconstruct data in the event of a failure of a disk drive storage device, in accordance with any of various known algorithms. Algorithms for reconstructing data in the event of a failure of a disk drive storage device are disclosed, e.g., in U.S. Pat. No. 5,596,709 to Bond et al., herein incorporated by reference. Preferably, RAID functions 402 further support the dynamic reassignment of data storage devices or portions thereof to different redundancy groups or using different redundancy methods (e.g., mirroring, parity, etc.), as described in U.S. Pat. No. 5,960,169 to Styczinski, herein incorporated by reference.

Type matching function 403 determines, for each data storage device 100, the type of data which is most optimally stored on the device, and attempts to map data of the appropriate type to each storage device on a dynamic basis. Preferably, data may be one of three types: Alphanumeric (also called text) data, which contains alphabetic characters, numbers, symbols, and so forth; graphics and audio (herein also called simply graphics), which contains still visual images and/or audio, and video, which contains moving video images. In the preferred embodiment, each disk drive is matched to a data type, i.e., the evaluation is done on a drive-by-drive basis. However, in an alternative embodiment, each disk surface within a drive is individually evaluated and matched to a data type. It would further be possible to evaluate individual portions of a disk surface, e.g., the inner 1/3, the middle 1/3, and the outer 1/3 concentric areas. In the discussion that follows, a system is described in accordance with the preferred embodiment, it being understood that any of the above alternatives could also be used.

Address map 404 contains a mapping of data addresses used by components of server system 300 above storage controller 320 (e.g., CPU 301 and memory 302), to addresses in the array of disk storage devices 100. I.e., in the preferred embodiment, storage controller 320 is responsible for choosing an actual disk drive device for storage of data, and shields the details of this choice from the higher level parts of server system 300. Server 300 preferably regards the collection of storage devices 100 as a single large storage entity, having a single large virtual address space. When a program executing on CPU 301 wants some data, it passes the virtual address of the data to storage controller, and storage controller obtains the physical location from address map 404. Address map 404 therefore contains entries mapping the virtual address space of server 300 to disk device and address range within the disk device in the array. In this manner, storage controller is free to choose a disk device, and to transfer data from one disk device to another, without affecting the virtual address of the data.

Device state table 405 contains information needed for selecting a destination device for writing data. Device state table 405 preferably contains information shown in Table 2, described below, and preferably contains at least three additional fields for each disk drive: Data_A, Data_G, and Data_V. These fields record the total amount of alphanumeric, graphic/sound, and video data, respectively, recorded on the corresponding disk drive. The use of table 405 is explained in greater detail herein.

Storage allocation map 406 identifies (by disk sector or other appropriate measure) the portions of each disk drive that have been allocated to storage records, and the type of records (alphanumeric, graphic/sound, video) recorded on each.

The process of identifying disk drives suitable for different categories of data types falls under general field of pattern recognition. In the preferred embodiment, a fuzzy pattern recognition system is used. Pattern recognition is a field that searches data for distinguishable features. Among the most desirable features for the selection of disk drives for different data types are the following:

1. Average disk drive operating temperature (TEMP)
2. Average soft error rate for the disk drive (SER)
3. Average seek-settle time for a disk drive (SST)
4. Flyheight of a head/surface within the disk drive (FH)

These are features that are easily measured or estimated as single numbers (singletons) either by direct measurements or from operating statistics. Several methods of multifeatured pattern recognition are discussed in the literature. See, for example, T. J. Ross, *Fuzzy Logic with Engineering Applications*, McGraw-Hill (1995), pp. 419–530. In the preferred embodiment, one very popular fuzzy logic multi-featured pattern recognition method called the weighted approaching degree is used. This multidimensional extension of feature space is surprisingly simple with a very elegant derivation.

The weighted multifeatured pattern recognition is defined for fuzzy pattern recognition in an environment where there are m identifying features. Usually, in the pattern recognition process some features are more important than others. It is therefore natural to assign weighting factors $w_j$, j=1, 2, . . . , m to each of the m features. The overall membership $\mu(x)$, herein referred to as the fuzzy classification score, can then be described by:

$$\mu(x) = \sum_{j=1}^{m} w_j \cdot \mu_j(x_j), \quad (1)$$

where $u_j(x_j)$ is the value of the membership function (fuzzy membership value) for the $j^{th}$, j=1, 2, . . . , m feature, and $x_j$ is the on-line measurement for the jth feature. Preferably, the weighting factors $w_j$ are normalized such that:

$$\sum_{j=1}^{m} w_j = 1. \quad (2)$$

Figure 5A:
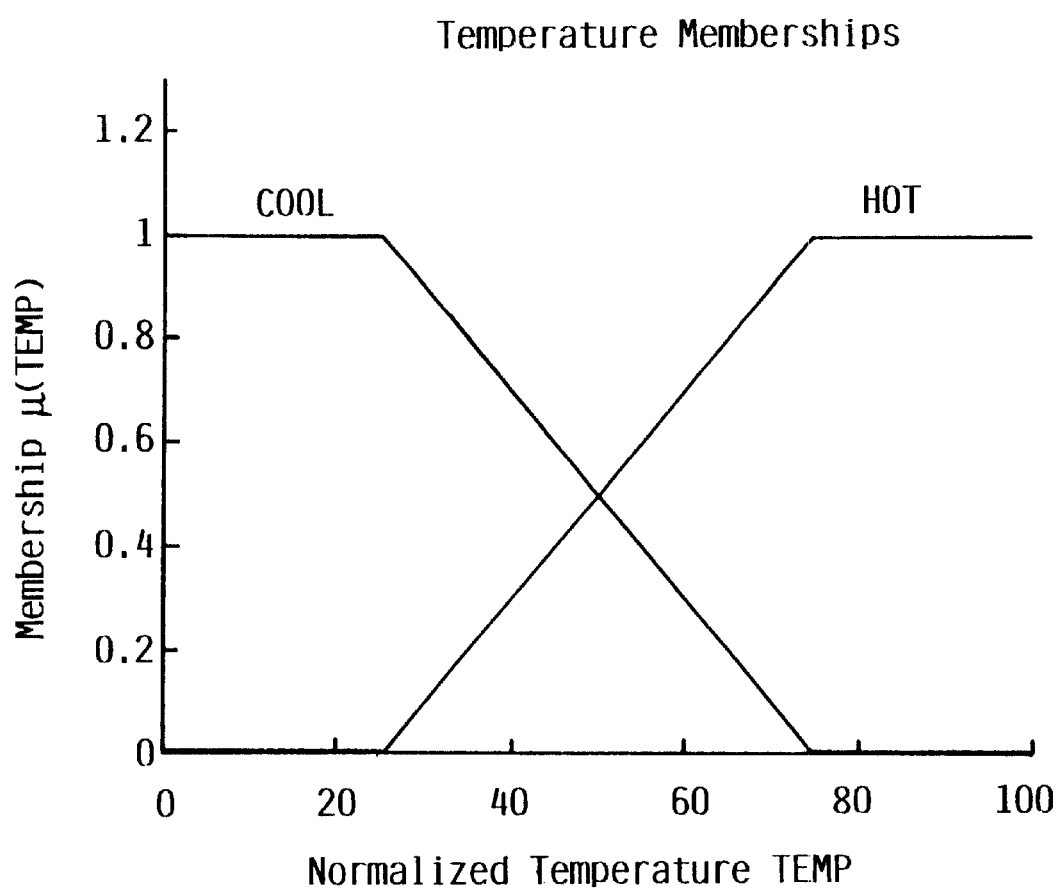
FIGS. 5A, 5B, 5C and 5D illustrate examples of two or more overlapping membership functions for each of the features used to classify drives, according to the preferred embodiment.

FIGS. 5A–5D illustrate examples of two or more overlapping membership functions for each of the features used to classify drives. For the drive temperature (TEMP), the membership functions COOL and HOT are shown in FIG. 5A. Drive temperature is measured directly with a sensor. The normalized drive temperature TEMP is computed as:

$$TEMP = 100 \frac{Temp - Temp(min)}{Temp(max) - Temp(min)} \quad (3)$$

where the actual temperature Temp is within the range Temp(min)<Temp<Temp(max).

Figure 5B:
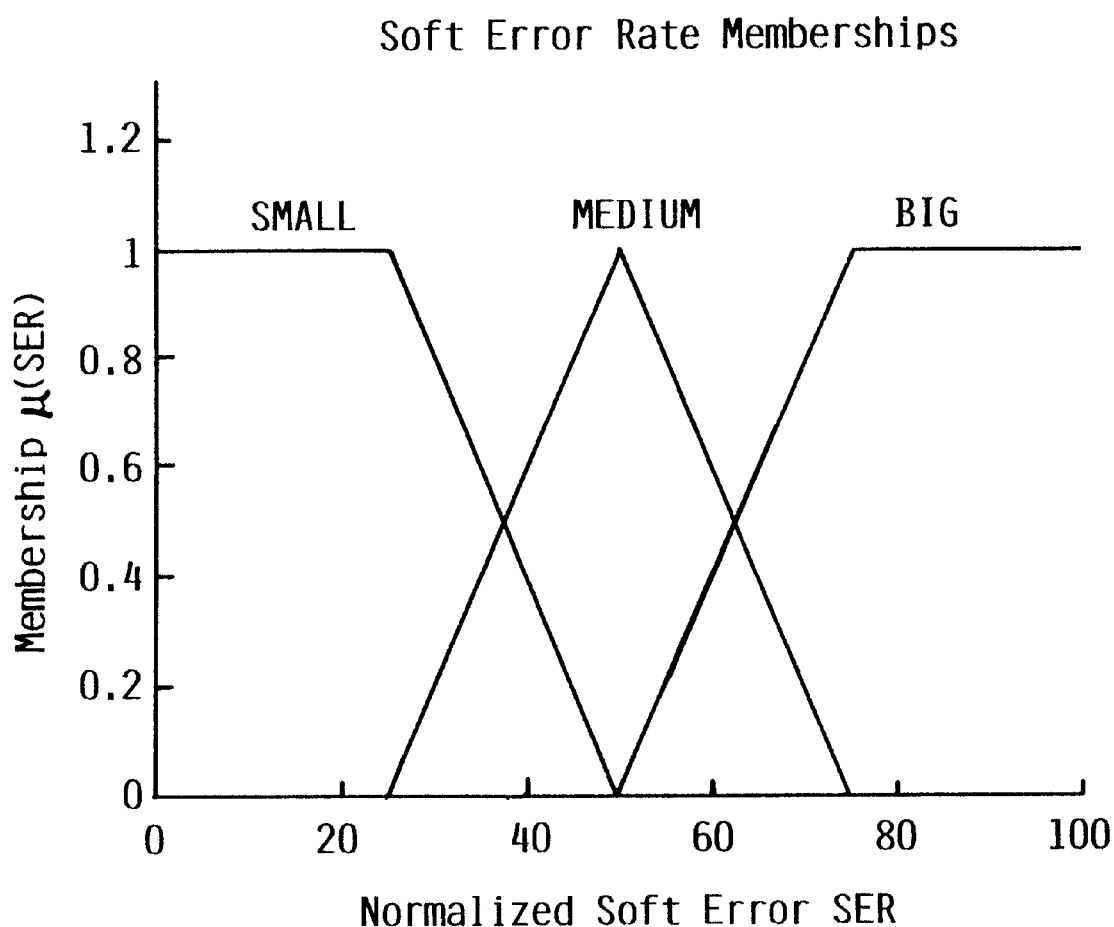

FIG. 5B illustrates the three membership functions SMALL, MEDIUM and BIG for the average soft error rate (Ser), where 0<Ser<Ser(max). Soft error rate is obtained from operating statistics. The soft error rate could be for a given head/surface within a given drive, or an average for the whole drive. The normalized soft error rate (SER) is:

$$SER = 100 \frac{Ser}{Ser(max)}. \quad (4)$$

Figure 5C:
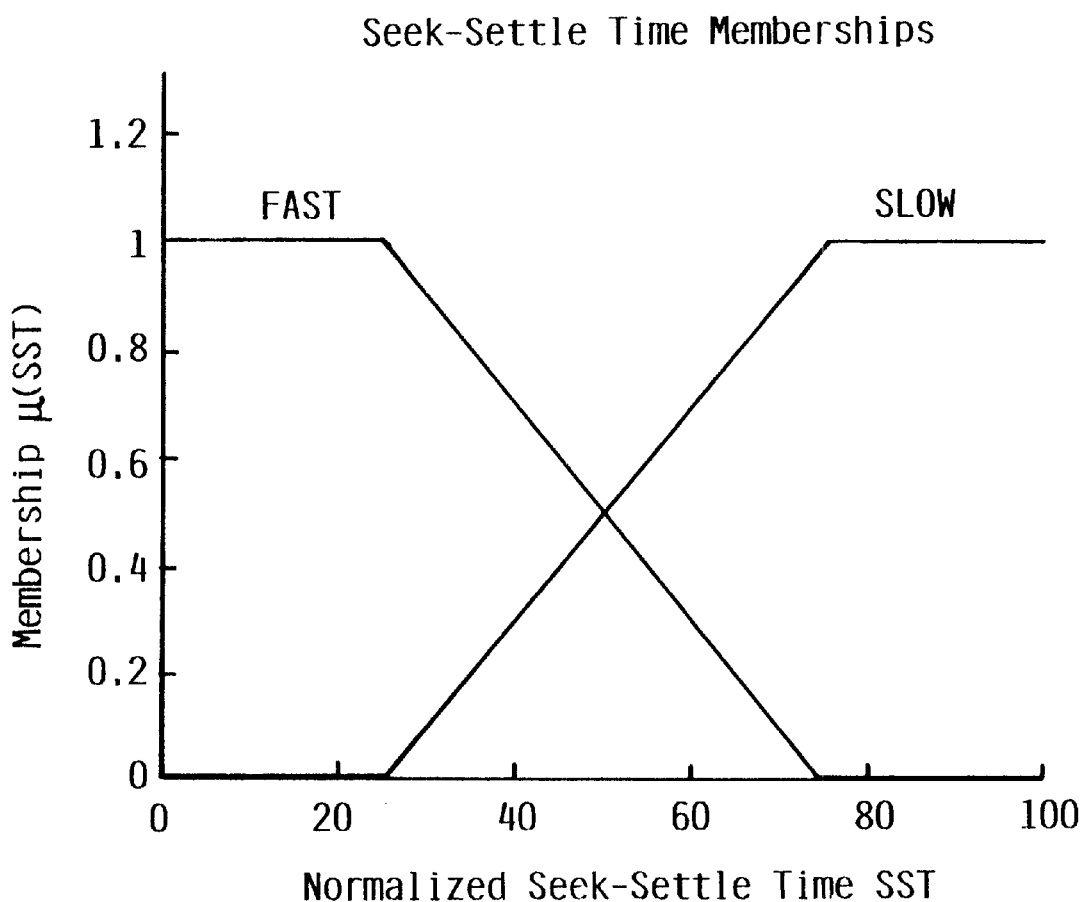

In FIG. 5C, the membership functions FAST and SLOW are depicted for the average seek-settle time Sst of the disk drive. The Sst is also obtained from operating statistics. The normalized average seek-settle time (SST) is computed similarly to the normalized temperature TEMP in equation (3) as:

$$SST = 100 \frac{Sst - Sst(min)}{Sst(max) - Sst(min)}. \quad (5)$$

Figure 5D:
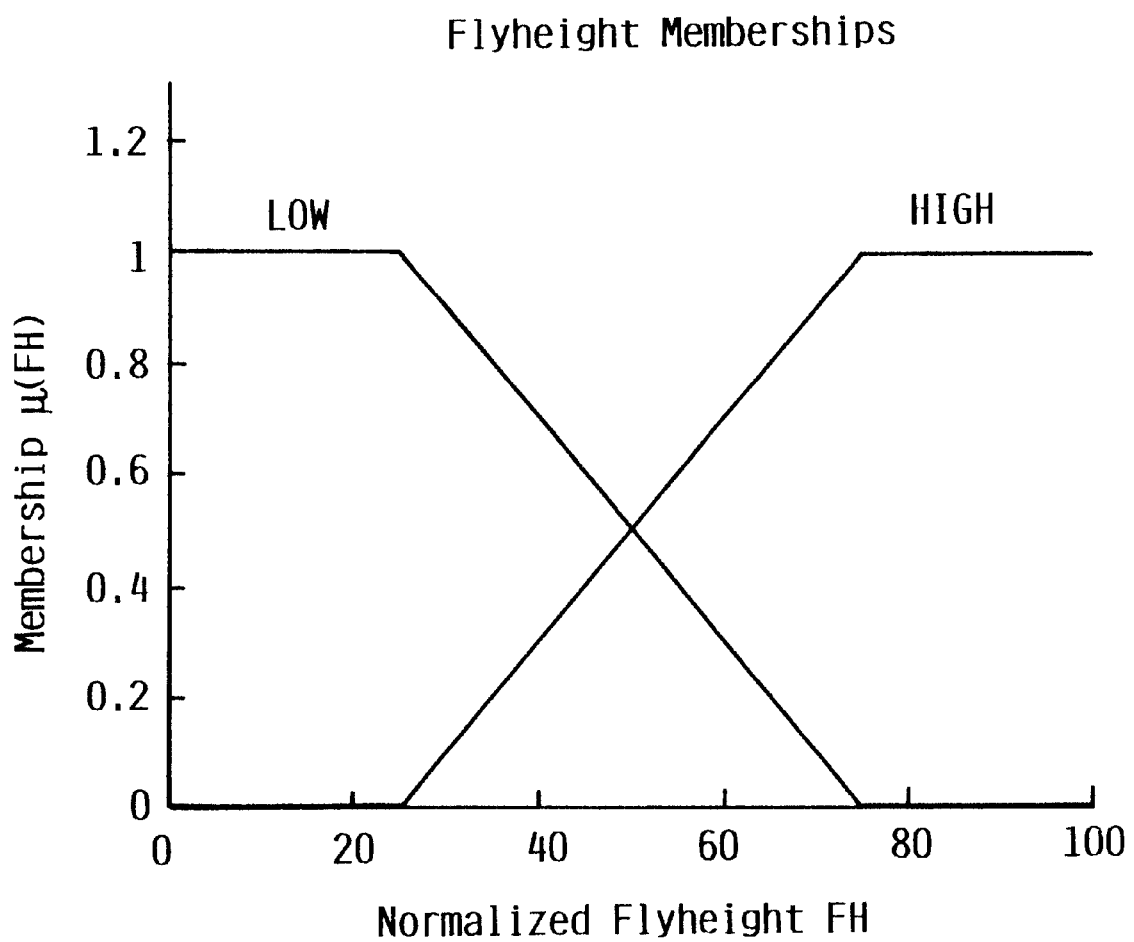

Finally, FIG. 5D shows two membership functions for flyheight (Fh), LOW and HIGH. Flyheight is difficult to measure directly, although flyheight may be inferred from other parameters. For example, one may use the technique described in U.S. Pat. No. 5,168,413 to Coker et al., entitled "Transducer Head Flying Height Monitoring Methods and Apparatus for Disk Drive System", herein incorporated by reference. Various other techniques for inferring flyheight are available and could be used in the alternative. The normalized average flyheight (FH) is calculated as $$FH = 100 \frac{Fh - Fh(min)}{Fh(max) - Fh(min)}. \quad (6)$$

In general, TEMP and SST will be the same or nearly the same for all surfaces of a disk drive, while SER and FH may vary from surface to surface. Where the drive is being evaluated as a whole (as opposed to each individual surface), it is possible to take an average of SER and/or FH. However, since these parameters are used to detect possible problems, it is also acceptable to weight the worst measurements more heavily. E.g., it would be possible to take the sum of squares of deviation from some nominal flyheight for each surface, or even to take the lowest measured flyheight of all surfaces, as the composite flyheight of a drive.

The normalized feature variables TEMP, SER, SST and FH in Equations (3), (4), (5) and (6), respectively, will under normal circumstances fall in the range from 0 to 100. If any of the variables fall outside this range, then the disk drive may be in a failure mode and appropriate actions will be taken to correct the situation.

Type matching function 403 receives data from each individual disk drive 100, and separately evaluates each drive for optimal data type. I.e., type matching function 403 first computes normalized feature variables TEMP, SER, SST and FH for each drive as described above. A fuzzy classification score for each data classification (alphnumeric, graphics/audio, or video) is then computed for each drive in accordance with Equation 1, to find a best fit for drive and type of data. Table 1 summarizes the fuzzy feature recognition associations for each data type, in an example of the preferred embodiment.

TABLE 1

Fuzzy Feature Association

| Data Classification | Feature Memberships | | | |
|---|---|---|---|---|
| | TEMP | SER | SST | FH |
| Alphanumeric | COOL | SMALL | FAST | HIGH |
| Graphics, Audio | HOT | MEDIUM | SLOW | LOW |
| Video | HOT | BIG | SLOW | LOW |

When the feature associations of Table 1 are rendered into equations of the form of Equation (1), the following three equations (7), (8) and (9) are obtained for determining an alphanumeric fuzzy classification score (ALPHA), a graphics/audio fuzzy classification score (GRAPHICS), and a video fuzzy classification score score (VIDEO):

ALPHA=w$_1$COOL(TEMP)+w$_2$SMALL(SER)+w$_3$FAST(SST)+
w$_4$HIGH(FH) (7)

GRAPHICS=w$_1$HOT(TEMP)+w$_2$MEDIUM(SER)+
w$_3$SLOW(SST)+w$_4$LOW(FH) (8)

VIDEO=w$_1$HOT(TEMP)+w$_2$BIG(SER)+w$_3$SLOW(SST)+
w$_4$LOW(FH) (9)

In the preferred embodiment, the weights are selected as follows: w$_1$=0.1; w$_2$=0.4; w$_3$=0.2; and w$_4$=0.3, it being understood that different weights could be used.

Table 2 shows examples of disk type matching evaluation using Equations (7), (8) and (9) and the weighting factors above for a hypothetical set of disk drives. The normalized feature variables TEMP, SER, SST and FH were selected for six different disk drives, and the fuzzy decision scores were computed for each case. As shown, drives 6 and 2 are preferably allocated to alphanumeric data, drives 1 and 4 are preferably allocated to video data, while drive 5 is preferably for graphics. The decision for drive 3 is less clear. In close situations such as that shown for drive 3, other considerations, particularly the relative amount of data of each type remaining to be stored, might be used.

TABLE 2

Fuzzy Evaluation Example

| Disk Drive | Normalized Feature Variables | | | | Fuzzy Classification Score | | |
|---|---|---|---|---|---|---|---|
| | TEMP | SER | SST | FH | Alpha | Graph | Video |
| 1 | 20 | 80 | 50 | 50 | 23% | 37% | 77% |
| 2 | 70 | 20 | 20 | 80 | 91% | 9% | 9% |
| 3 | 70 | 70 | 20 | 80 | 51% | 17% | 41% |
| 4 | 70 | 90 | 20 | 20 | 21% | 39% | 79% |
| 5 | 70 | 50 | 20 | 20 | 21% | 79% | 39% |
| 6 | 10 | 10 | 10 | 80 | 100% | 0% | 0% |

Whenever a new data record, file or similar entity is to be written to storage, control program 401 determines on which disk drive to store the new data. The determination of drive to use is based on the ALPHA, GRAPHICS and VIDEO fuzzy classification scores for each respective drive. Control program may also take into account other factors, such as the available storage space on each of the disk drives. This determination may be complex, but need not be. For example, in one embodiment, the each drive is assigned a preferred data type by first determining the total percentage of stored alphanumeric data, graphics data, and video data, and applying these percentages to the total number of disk drives to determine the number of drives to assign to each type of data, designated $N_A$, $N_G$, and $N_V$, respectively. The $N_A$ drives for alphanumeric data are then chosen by taking the $N_A$ drives having the highest ALPHA scores. $N_G$ drives are next chosen for graphics data by taking the highest $N_G$ GRAPHICS scores, which haven't already been assigned to alphanumeric data. The remaining drives are assigned to video data. In making these determinations, the control program must take into account any space required for data redundancy, such as mirrored data or parity (it is possible that different redundancy schemes will be used for different data types). The above determination need not be done for each write operation, and may be done on a periodic basis. When new data of a particular type is to be written, the controller simply chooses any drive assigned to that data type. Preferably, it chooses the drive, which is assigned to the type of data to be written, and which has the most available free space.

In the preferred embodiment, the control program chooses a drive as described above whenever a new data record or file is written. If an existing data record is simply being updated, the control program writes the data to the existing location in the disk drive array. However, it would alternatively be possible to choose a drive as described above whenever updated data is written, and the existing data is on a drive of incompatible type. E.g., if alphanumeric data is to be updated, but the existing alphanumeric record is on a disk which, using the above selection procedure, is optimally assigned to graphics or video data, the control program could choose one of the drives assigned to alphanumeric data as the destination of the updated record, and following a write of the data to the new drive, de-allocate the storage for the old record on the drive assigned to graphics or video data.

In operation, control program 401 executing on processor 321 obtains input from the disk drives 100 and re-computes the various fuzzy membership values and fuzzy classification scores on a periodic basis. Preferably, an updated evaluation is triggered on the basis of power-on hours (e.g., every 4 hours), although other triggering events could be used, such as a specified number of storage access operations. The results of the evaluation (i.e., values such as shown in Table 2) are stored in device state table 405.

Figure 6:
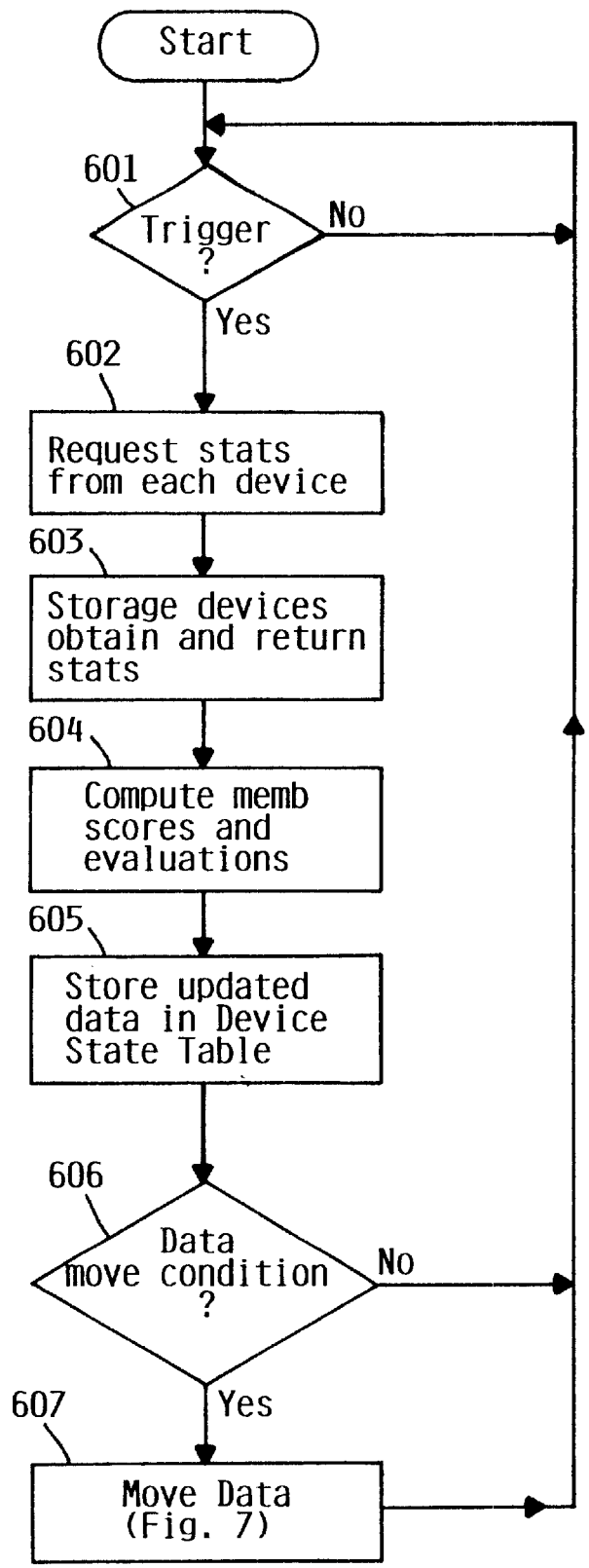
FIG. 6 is a high-level flow diagram of the process of updating the fuzzy membership values and fuzzy classification scores, according to the preferred embodiment.

FIG. 6 is a high-level flow diagram of the process of updating the fuzzy membership values and classification scores. The process of updating the fuzzy membership values and classification scores is a task that runs in the background, while storage controller 320 is performing other tasks, particularly normal data access tasks. As shown in FIG. 6, control program 401 waits at step 601 for a trigger condition to be met, the trigger condition preferably being that a predetermined number of power-on hours has elapsed since the last update. When the trigger condition is met, the control program sends a poll to each disk device, requesting that the device provide the raw data needed for computation of the fuzzy membership values (step 602). This may be in the form of a sequential poll to individual devices, or a broadcast to all devices simultaneously. The storage devices then respond by obtaining and returning the requested raw data (step 603). Since each storage device 100 preferably has its own on-board controller processor 221, it is capable of performing some of the computations itself. In fact, it could perform all of the computations, returning only the final fuzzy classification scores. However, for reason of system maintenance and assuring uniformity of reporting, it is preferred that computation of normalization, fuzzy membership values and fuzzy classification scores be performed at the controller level. Nevertheless, the disk's on-board processor 221 controller will probably perform some reduction of the raw data. For example, a soft error rate may be computed at the disk drive level by dividing the number of logged soft errors by total operations. While a particular embodiment is described herein, it should be understood that the present invention is not limited by the location at which various quantities are computed.

Upon receipt of the raw data from the various disk drives 100, control program 401 computes fuzzy membership values and fuzzy classification scores as described above (step 604). The classificaiton scores are stored in device state table 405 (step 605).

Control program then determines whether a condition for moving data from one storage device to another has been met (step 606). I.e., the program determines whether the controller should migrate data among disk drives or disk surfaces as a result of changes in the fuzzy classification scores of one or more drives. It would be possible to use any of various elaborate and sophisticated algorithms for doing this, but in the preferred embodiment a simple test is used. Since one of the primary purposes of classifying disk drives is to avoid storing alphanumeric data on marginal drives, control program merely examines the ALPHA score of each drive, and if any drive is below a certain threshold and contains alphanumeric data, the condition is met (YES branch from step 606 is taken). The threshold may be a fixed threshold (e.g., 50%), or it may be a dynamic threshold which varies with the average ALPHA scores of all the disk drives and/or the total volume of alphanumeric data stored.

Figure 7:
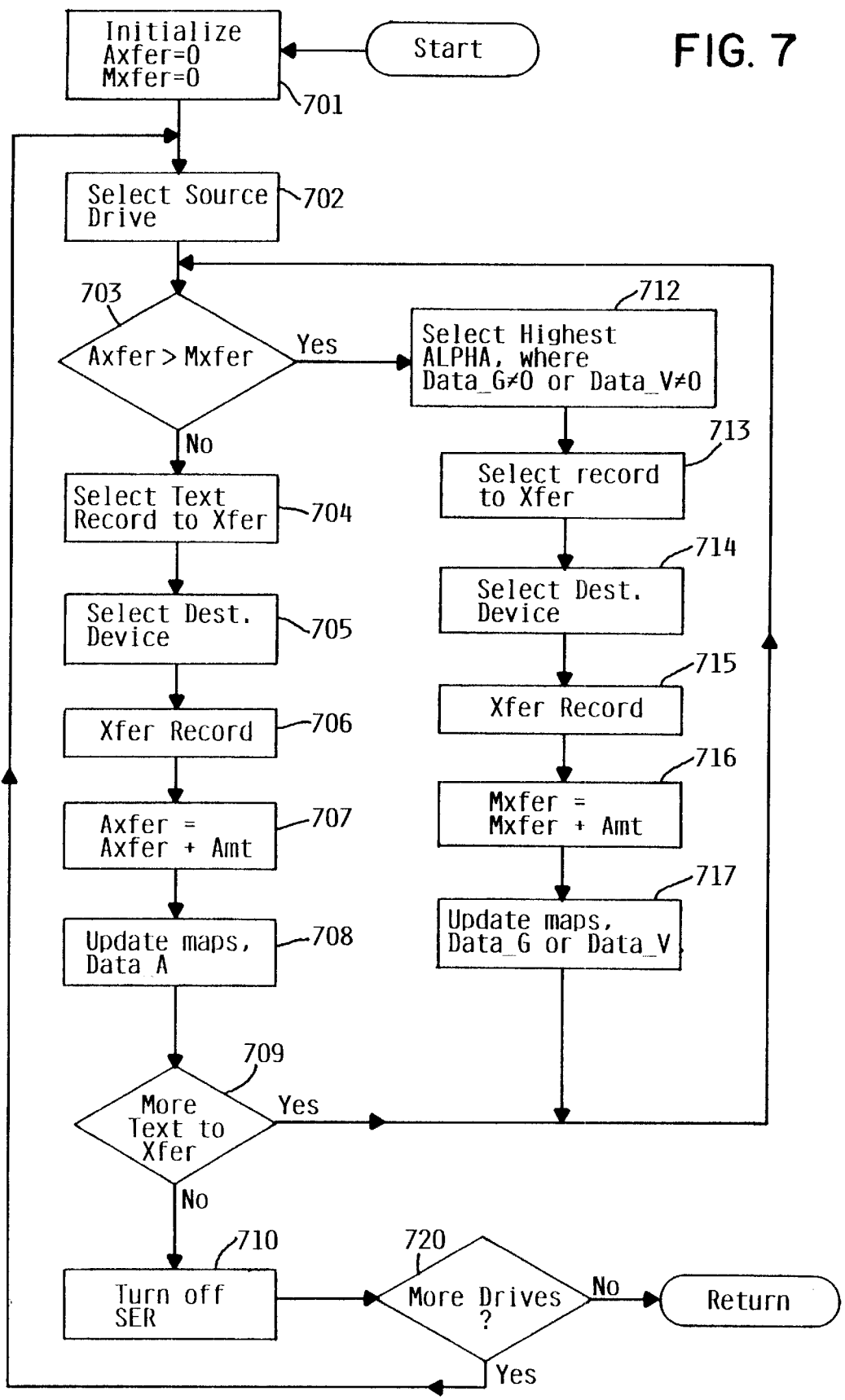
FIG. 7 is a flow diagram showing the process of migrating data, according to the preferred embodiment.

If the threshold condition is met, a data migration procedure is performed (step 607), as shown in greater detail in FIG. 7.

Like the process of updating fuzzy membership values and classification scores, data migration preferably takes place in the background, and due to the number of data transfers that may be necessary, may take considerably longer to complete that the process of updating fuzzy membership values and classification scores. Referring to FIG. 7, to migrate data, two variables Axfer and Mxfer are initialized to 0 (step 701). These variables are used to keep track of the total number of bytes transferred in each direction (from alphanumeric disks to graphics/video disks, and reverse), in order to obtain a rough balance. A source disk drive is then chosen (step 702). The source drive is a disk drive having at least some alphanumeric data, and which met the threshold for data migration explained above, it being understood that there could be one such drive, or more than one.

Control program 401 then compares variables Axfer and Mxfer to determine which is greater, i.e., whether to transfer text to an ALPHA disk, or to transfer graphics/video from an ALPHA disk (step 703). If Axfer is less than or equal to Mxfer, a text transfer takes place (NO branch from step 703). In this case, control program selects an arbitrary text record from the source disk drive (step 704). Control program then selects a destination device for the record (step 705). In the preferred embodiment, the selection criteria are identical to those used for selecting a destination disk drive when a new record is being written, as explained above. Control program then transfers the selected record by performing a read followed by a write operation (step 706). Where data redundancy is used, it may also be necessary to update parity, mirrored copies, or other redundant data. The variable Axfer is then incremented by the total number of bytes that were transferred (step 707). Additionally, the Data_A fields in device state table 405 are updated by decrementing the $Data_{13}$ A field of the source device and incrementing the Data_A field of the destination device by the amount of data transferred. Control program will also perform additional bookkeeping functions normal to deletion or writing of data, such as updating address map 404 and allocation map 406. If any alphanumeric records remain in the source device (step 709), control program returns to step 703 to transfer additional records. If not, the NO branch is taken from step 709.

At this point, there is no more text data on the source disk drive. Control program then disables or limits soft error recovery in the source disk drive (step 710). Preferably, this is accomplished by sending a command to the source disk drive. The drive contains an enable/disable field 230 in its on-board RAM, and sets this field to disable or limit soft error recovery. Thereafter, the drive, upon encountering a soft error, either does not attempt to recover the error or limits the soft error recovery to some specified level of steps. If a soft error is not recovered, the drive simply passes the erroneous data on to the storage controller, and ultimately server 300, without any indication that the data is erroneous.

Control program then determines whether there are any more drives which meet the threshold condition for data migration (step 720). If so, control program proceeds to step 702 to select another such drive. If not, the migration task is complete.

If, at step 703, the YES branch is taken, control program 401 performs a transfer of a record from an ALPHA disk to a non-ALPHA disk. Control program first selects the disk drive having the highest ALPHA score, which has at least some non-alphanumeric data, i.e., in which either Data_G or Data_V is nonzero (step 712). This disk will be the source disk for the data transfer. Control program then selects a non-text record from the source disk for transfer (step 713). A video record will be selected in preference to a graphics/sound record, if one is available, but the selection may otherwise be arbitrary. Control program then selects a destination device for the selected record (step 714). Preferably, the selection of a destination device uses the same criteria as are used for selection of a destination device when writing a new record, as explained above. Control program then transfers the selected record (step 715), also updating any redundancy data if necessary. The variable Mxfer is then incremented by the number of bytes that were transferred (step 716). Control program then updates the variables Data_G or Data_V, as appropriate, in device state table 405, and updates address map 404 and allocation map 406 (step 717). It then proceeds to step 703 to initiate the next data transfer.

In the preferred embodiment, data is migrated as a specific migration task operating in the background when certain threshold conditions are met, as shown in FIG. 7 and described herein. However, such as data migration task is an optional function of control program 401. It would alternatively be possible to simply allow data to migrate over time as a natural result of deleting, adding and updating data.

As described herein, soft error recovery is preferably disabled or limited in drives containing no text data. The reason for this is that minor errors in graphics, sound and video generally go unnoticed by the user, and can be tolerated. Disabling soft error recovery for this type of data improves the performance of the disk drive. Furthermore, it reduces the workload on the drive by reducing the number of repetitive read operations or other things that must be done as part of soft error recovery. This could extend the life of marginal disk drives.

Various alternative approaches may be taken to disabling or limiting soft error recovery. For example, it would be possible to disable soft error recovery only for video data, while keeping it for graphics. It would further be possible to disable soft error recovery entirely for video data, while merely limiting soft error recovery for graphics, or to limit soft error recovery for both, using either the same or different step limits. Although described in the preferred embodiment as applicable to a disk drive as a whole, it will be appreciated that, if data of different types is being assigned to different disk surfaces of the same disk drive, it would be equally possible to disable or limit soft error recovery for selective surfaces of a disk drive. In this case, enable/disable field 230 may consist of an array of bits or integers, one corresponding to each surface. Disabling or limiting of soft error recovery in drives containing no text data may be accomplished, e.g., by initially disabling or limiting soft error recovery in all drives (as a default), and selectively enabling soft error recovery any time text data is written to a drive which previously contained no text data. Additionally, the soft error recovery should be disabled again any time text data is migrated off a disk drive, as shown in FIG. 7 and described above. Preferably, the drive continues to collect statistics concerning the frequency of soft errors, although it does not actually undertake soft error recovery. While soft error recovery is selectively disabled in the preferred embodiment, it would alternatively be possible to match data type to disk drive operating parameters without disabling any soft error recovery.

The methods and apparatus described herein for matching data type with the operating parameters of storage devices have been referred to as "fuzzy logic" functions. It should be understood that a particular form of fuzzy logic implementation is described herein as a preferred embodiment, but that the present invention is not necessarily limited to any particular type of fuzzy logic implementation, nor is it necessarily limited to any of the collection of methods which are typically referred to as "fuzzy logic". It would also be possible to use neural networks, look-up tables, or any of various other alternatives for receiving operating parameters from a set of storage devices and determining optimal assignment of data types using that information.

In the preferred embodiment, the primary functions of maintaining an array of disk drive storage devices are performed in an intelligent storage controller, having its own programmable processor and memory. However, it should be understood that the matching of disk drive operating parameters to data type in accordance with the present invention could be performed using different hardware, or could be performed using different software or data structures, and that particular functions described herein could be allocated to different functional units in a different manner. In particular, it would be possible to perform some or all of the functions described in a CPU of a host computer system such as CPU 301 of server 300. Additionally, at least some of the functions described herein could be performed by the disk drives themselves. Alternatively, there could be multiple storage controllers or multiple hierarchical levels of storage controllers, which appropriate function being allocated to each.

In the preferred embodiment, four specific parameters, temperature, soft erorr rate, seek-settle time, and flyheight, are used to evaluate disk drives for optimal compatibility with different data types. Furthermore, data is divided into three specific types: alphanumeric (also called text), still graphics and sound, and video. However, consistent with the present invention, different disk drive operating parameters could be used, and data could be classified in different categories. For example, data could simply be classified as alphanumeric or non-alphanumeric, or more fine-grained classifications are possible. Examples of additional disk drive operating parameters used to predict impending drive failure are explained in commonly assigned copending U.S. patent application Ser. No. 09/503,457, filed Feb. 14, 2000, by Gordon J. Smith, entitled "Self-Monitoring Storage Device Using Neural Networks", which is herein incorporated by reference.

In the preferred embodiment, the self-monitoring storage device is a rotating magnetic hard disk drive storage device. It would alternatively be possible to a method for matching data to storage device operating parameters as described herein for matching data in sets of other types of data storage devices, such as optical storage devices, magnetic tape storage devices, and the like.

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as disk surface 102, in FIG. 2 as ROM 222, and in FIG. 3 as memory 322.

Although a specific embodiment of the invention has been disclosed along with certain alternatives, it will be recognized by those skilled in the art that additional variations in form and detail may be made within the scope of the following claims:

What is claimed is:

1. A method for managing the storage of heterogeneous data, said heterogenous data comprising data of a first type and data of a second type, on a plurality of data storage devices of a same type, said method comprising the steps of:

measuring a plurality of internal operating parameters with respect to each of said plurality of data storage devices, wherein said internal operating parameters are parameters exhibiting unintentional individual performance variation among said plurality of data storage devices;

determining at least one evaluation result using fuzzy logic for each respective data storage device of said plurality of data storage devices, said at least one evaluation result being derived from said plurality of measured internal operating parameters;

selecting a data storage device for storage of data according to the type of said data and the measured internal operating parameters of the selected data storage device by matching said type of data to said evaluation results with respect to said plurality of data storage devices.

2. The method of claim 1, wherein said data of a first type consists of alphanumeric data, and said data of a second type consists of non-alphanumeric data.

3. The method of claim 2, wherein said heterogenous data comprises data of a third type, said data of a third type consisting of video data.

4. The method of claim 1, wherein said data storage device is a rotating magnetic rigid disk drive storage device.

5. The method of claim 1, further comprising the step of:
maintaining at least some of said heterogeneous data in a redundant format.

6. The method of claim 5, wherein data of said first type is maintained in a first redundant format, and data of said second type is maintained in a second redundant format different from said first redundant format.

7. The method of claim 5, wherein data of said first type is maintained in a first redundant format, and data of said second type is maintained in a non-redundant format.

8. The method of claim 1, further comprising the step of:
selectively disabling at least one soft error recovery function in at least one data storage device which contains no data of said first type.

9. The method of claim 1, wherein said plurality of internal operating parameters includes at least one measure of soft error rate.

10. The method of claim 1, wherein said plurality of internal operating parameters includes at least one measure of flyheight.

11. The method of claim 1, wherein said plurality of internal operating parameters includes at least one measure of temperature.

12. The method of claim 1, wherein said plurality of internal operating parameters includes at least one measure of seek-settle time.

13. A program product for controlling the operation of a storage controller, said storage controller controlling a plurality of digital data storage devices of a same type, said plurality of digital data storage devices for storing heterogenous data comprising data of a first data type and data of a second data type, said program product comprising:

a plurality of processor executable instructions recorded on signal-bearing media, wherein said instructions, when executed by at least one programmable processor of said storage controller, cause the storage controller to perform the steps of:

obtaining a plurality of internal operating parameters with respect to each of said plurality of data storage devices, wherein said internal operating parameters are parameters exhibiting unintentional individual performance variation among said plurality of data storage devices;

determining at least one evaluation result using fuzzy logic for each respective data storage device of said plurality of data storage devices, said at least one evaluation result being derived from said plurality of measured internal operating parameters;

selecting a data storage device for storage of data according to the type of said data and the measured internal operating parameters of the selected data storage device by matching said type of data to said evaluation results with respect to said plurality of data storage devices.

14. The program product of claim 13, wherein said data of a first type consists of alphanumeric data, and said data of a second type consists of non-alphanumeric data.

15. The program product of claim 13, wherein said executable instructions further cause the storage controller to perform the step of:

maintaining at least some of said heterogeneous data in a redundant format.

16. The program product of claim 13, wherein said executable instructions further cause the storage controller to perform the step of:

selectively disabling at least one soft error recovery function in at least one data storage device which contains no data of said first type.

17. The program product of claim 13, wherein said plurality of internal operating parameters includes at least one measure of soft error rate.

18. A data storage subsystem for storing heterogeneous data, said heterogenous data comprising data of first type and data of a second type, comprising:

a plurality of data storage devices of a same type;

a data storage controller coupled to said plurality of data storage devices and controlling the operation of said plurality of data storage devices, said data storage controller including a programmable processor and a memory for storing instructions executable on said programmable processor;

a control program executable on said programmable processor, said control program including:

a storage device parameter gathering function, said storage device parameter gathering function obtaining a plurality of internal operating parameters with respect to each of said plurality of data storage devices, wherein said internal operating parameters are parameters exhibiting unintentional individual performance variation among said plurality of data storage devices; and a data type matching function, said data type matching function determining at least one evaluation result using fuzzy logic for each respective data storage device of said plurality of data storage devices, said at least one evaluation result being derived from said plurality of measured internal operating parameters, said data type matching function matching the type of data to be stored with said internal operating parameters of a selected data storage device by matching said type of data to said evaluation results with respect to said plurality of data storage devices.

19. A method for managing the storage of heterogeneous data, said heterogenous data comprising data of a first type, said data of a first type consisting of alphanumeric data, and data of a second type, said data of a second type consisting of non-alphanumeric data, on a plurality of rotating magnetic disk drive data storage devices of a same type, said method comprising the steps of:

measuring at least one internal operating parameter with respect to each of a plurality of rotating magnetic disk drive data storage devices, wherein said at least one internal operating parameter is a parameter exhibiting unintentional individual performance variation among said plurality of data storage devices;

determining at least one evaluation result using fuzzy logic for each respective data storage device of said plurality of data storage devices, said at least one evaluation result being derived from said plurality of measured internal operating parameters; and selecting a disk drive data storage device for storage of data according to the type of said data and the at least one measured internal operating parameter of the selected data storage device by matching said type of data to said evaluation results with respect to said plurality of data storage devices.

20. The method of claim 19, wherein said heterogenous data comprises data of a third type, said data of a third type consisting of video data.

21. The method of claim 19, further comprising the step of:

maintaining at least some of said heterogeneous data in a redundant format.

22. The method of claim 19, further comprising the step of:

selectively disabling at least one soft error recovery function in at least one disk drive data storage device which contains no data of said first type.

23. The method of claim 19, wherein said at least one internal operating parameter includes at least one measure of soft error rate.

* * * * *

UNITED STATES PATENT AND TRADEMARK OFFICE
CERTIFICATE OF CORRECTION

PATENT NO. : 6,571,310 B1
DATED : May 27, 2003
INVENTOR(S) : Hal Hjalmar Ottesen and Gordon James Smith It is certified that error appears in the above-identified patent and that said Letters Patent is hereby corrected as shown below:

<u>Title page,</u>
Item [75], Inventors, "Hjallmar" should be -- Hjalmar --.

Signed and Sealed this

Thirtieth Day of September, 2003

JAMES E. ROGAN
*Director of the United States Patent and Trademark Office*